(No Model.) 2 Sheets—Sheet 2.
F. T. DAVIS.
CHECK REIN.
No. 347,162. Patented Aug. 10, 1886.
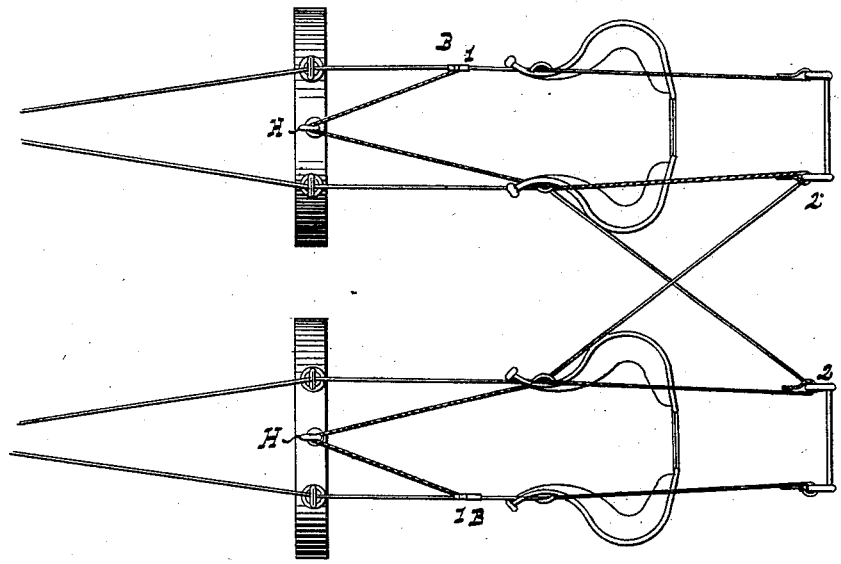
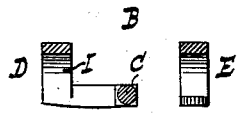
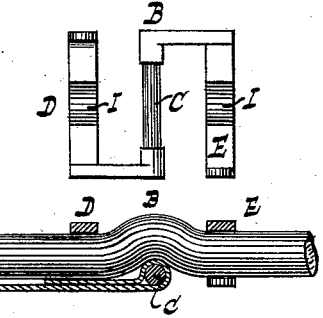
WITNESSES:
INVENTOR
Franklin T. Davis.
BY
his ATTORNEYS

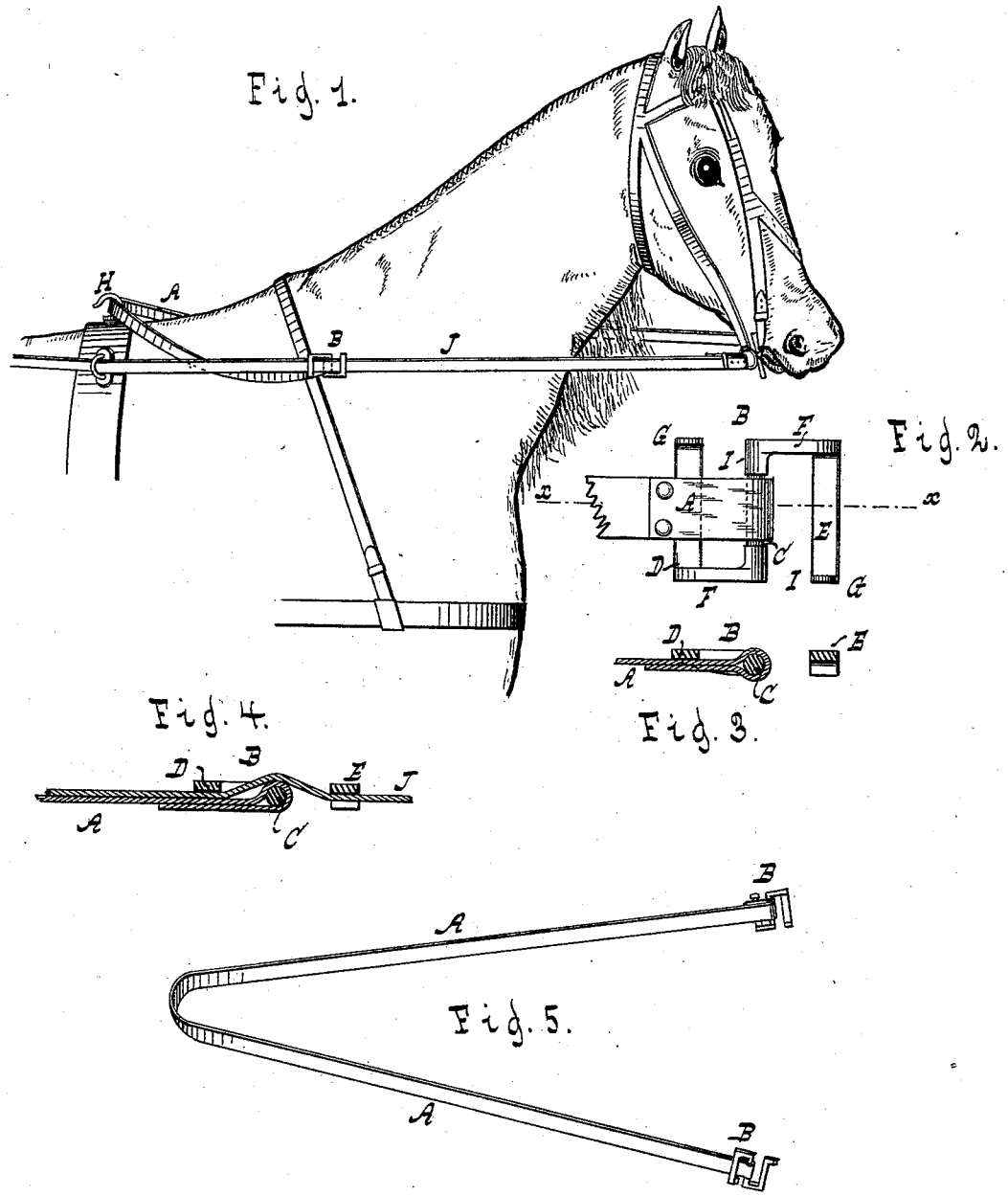

UNITED STATES PATENT OFFICE.

FRANKLIN T. DAVIS, OF MOUNT VERNON, NEW YORK.

CHECK-REIN.

SPECIFICATION forming part of Letters Patent No. 347,162, dated August 10, 1886.

Application filed January 21, 1886. Serial No. 189,303. (No model.)

*To all whom it may concern:*

Be it known that I, FRANKLIN T. DAVIS, a citizen of the United States, residing at Mount Vernon, in the county of Westchester and State of New York, have invented new and useful Improvements in Check-Reins, of which the following is a specification.

This invention relates to check-reins, and is intended to take the place of the ordinary check-rein, serving to keep the horse's head well up without distressing him, and allowing his head to have free and natural play, both in driving and when at rest, and keeping the driving-reins from falling down and becoming entangled with the ends of the thills of the wagon or with the feet of the horse.

The invention consists in the combination of the ordinary reins with a strap which engages loosely with the usual check-hook on the saddle of the harness, or with an equivalent hook arranged on the back or near the shoulders of the horse, the ends of the strap being provided with suitable means for engaging with the driving-reins at points between the shoulders of the horse and his head, but preferably near his shoulders. The means shown in this example for connecting the check-strap with the reins consists of an adjusting-hook provided with a central bar, to which the end of the strap is secured, and on each side of the central bar is another bar, under which the driving-rein passes, the construction being such that the driving-rein passes under one of the outer bars, thence over the central bar, and thence under the other outer bar, so that the rein is deflected or bent as it passes from one bar to the other, the several bars being in the same plane, or substantially so, and the edges of the outer bars against which the driving-rein bears being angular, so as to bend the rein out of its course and produce friction enough to keep the rein from slipping.

The construction and application of my invention are further explained hereinafter in connection with the accompanying drawings, in which—

Figure 1 shows my invention applied to the driving-reins of single harness. Fig. 2 is an elevation of the inner face of one of the adjusting-hooks, showing the check-strap connected thereto. Fig. 3 is a cross-section on the line $x$ $x$ of Fig. 2. Fig. 4 is a similar cross-section with the addition that the driving-rein is passed through the adjusting-hook. Fig. 5 shows the check-strap with an adjusting-hook at the ends ready to be applied to use in single harness, as in Fig. 1. Figs. 6, 7, and 8 show my invention applied to a round driving-rein. Fig. 9 shows my invention applied to double harness.

Similar letters indicate corresponding parts.

The letter A designates my check-strap, and B is the adjusting-hook at its ends. The check-strap may have such a hook at each end when it is to be used in connection with the driving-lines of single harness, as shown in Fig. 1.

The adjusting-hook B has a central bar, C, around which the end of the check-strap is passed, and is then fastened to the body of the strap by rivets or other suitable fastenings. Outside of the central bar, C, are two other bars, D E, which are connected to opposite ends of the bar C by plates F, the construction being such that the central bar, the outer bars, and the connecting-plates are rigidly and firmly connected to each other, whether made out of a single piece of metal or of several pieces united together. The free ends of the bars D E are made with shoulders G G, which act as stops to prevent the driving-reins from running off the bars. The check-strap extends from the central bar, C, under the outer bar, D, and from thence to the check-hook H on the saddle of the harness, around which it is passed loosely, its other end (in the case of single harness) being provided with a similar adjusting-hook for attaching it to the other driving-rein. The adjusting-hook of the check-strap is attached to the driving-rein J at any desired point by bending the latter and passing it edgewise into the openings I between the central bar and the outer bars, so as to bring it into the position represented in Fig. 4.

When the device is adjusted to the driving-reins, the driving-reins in being straightened, as in the act of driving, will cause the check-strap to slacken, and the horse's head will be free from restraint on the part of the check-strap. When the horse comes to a standstill and the driving-reins are dropped or relaxed, the horse, although free to turn his head around from side to side and bend his neck sidewise, is restrained by the combined check-strap and driving-reins in moving his head downward and outward, and the driving-reins, notwithstanding they may be dropped by the driver, cannot fall down to the ground or become entangled with the thills of the vehicle or with the feet of the horse, because the check-strap will hold them up.

In applying my invention to round driving-reins I modify the form of the adjusting-hook, as represented in Fig. 6, where the outer bars, D and E, have concave spaces I, in or through which the driving-rein passes, going over the central bar, C, in passing from one of the outer bars to the other. The hold of the adjusting-hook on the round driving-rein by means of the bend of the rein in the hook and by friction is substantially similar, as in the case of the flat driving-rein in the hook previously described.

Fig. 9 shows the application of the invention to double harness. In that case the adjusting-hook is fastened only to one end of the check-strap, as indicated at 1 1 in that figure, the check-straps passing thence around the check-hooks H H to the heads of the horses, where they are fastened to the bits at 2 2.

I do not restrict myself to the particular forms of adjusting-hooks which I have described in carrying out my invention; but I desire to claim my check rein or strap combined with a driving-rein by means of any hook or fastening applied to the driving-rein between the check-hook and the head of the horse.

What I claim as new, and desire to secure by Letters Patent, is—

1. The combination, with the driving rein or reins J and check-hook H, of the check-strap A, connected with the reins and disconnected from the bridle otherwise than by the rein or reins, so that it is rendered a check only when the driving-reins are loosened, substantially as described.

2. The adjusting-hook B, constructed, substantially as described and shown, with open spaces I I between its central and outer bars, C and D E, and shoulders G G on the ends of the bars D E, in combination with the check strap or rein A and driving-rein J, substantially as shown and described.

In testimony whereof I have hereunto set my hand and seal in the presence of two subscribing witnesses.

FRANKLIN T. DAVIS. [L. S.]

Witnesses:
  WM. W. HOWE,
  GEO. H. CAMERON.